US012115110B2

(12) United States Patent
Traxinger et al.

(10) Patent No.: US 12,115,110 B2
(45) Date of Patent: Oct. 15, 2024

(54) MANUAL WHEELCHAIR PROPULSION SYSTEM

(71) Applicant: Sunrise Medical (US) LLC, Fresno, CA (US)

(72) Inventors: Samuel Traxinger, Fresno, CA (US); Mark Greig, Fresno, CA (US); Jefferey Bashian, Fresno, CA (US); Daniel Zhou, Fresno, CA (US)

(73) Assignee: Sunrise Medical (US) LLC, Fresno, CA (US)

( * ) Notice: Subject to any disclaimer, the term of this patent is extended or adjusted under 35 U.S.C. 154(b) by 657 days.

(21) Appl. No.: 17/416,801

(22) PCT Filed: Dec. 23, 2019

(86) PCT No.: PCT/US2019/068377
§ 371 (c)(1),
(2) Date: Jun. 21, 2021

(87) PCT Pub. No.: WO2020/132685
PCT Pub. Date: Jun. 25, 2020

(65) Prior Publication Data
US 2022/0062076 A1 Mar. 3, 2022

Related U.S. Application Data

(60) Provisional application No. 62/784,015, filed on Dec. 21, 2018.

(51) Int. Cl.
A61G 5/04 (2013.01)
A61G 5/02 (2006.01)
(52) U.S. Cl.
CPC ............ A61G 5/047 (2013.01); A61G 5/027 (2013.01)

(58) Field of Classification Search
CPC ..................................................... A61G 5/047
See application file for complete search history.

(56) References Cited

U.S. PATENT DOCUMENTS 3,387,681 A 6/1968 Rabjohn
5,222,567 A 6/1993 Broadhead et al.
(Continued)

FOREIGN PATENT DOCUMENTS

DE 19935506 A1 2/2001
EP 0770371 A1 * 9/1996
(Continued)

OTHER PUBLICATIONS

EPO English machine translation f KR20140101970.
(Continued)

Primary Examiner — Tony H Winner
Assistant Examiner — Hosam Shabara
(74) Attorney, Agent, or Firm — MacMillan, Sobanski & Todd, LLC

(57) ABSTRACT

A propulsion system for a manual wheelchair includes a mounting clamp and a propulsion drive unit having a drive wheel assembly and a support suspension. The support suspension is configured to provide linear movement of the drive wheel and drive hub assembly relative to the manual wheelchair. The support suspension includes a linear bearing and slide member assembly having at least one linear bearing and a slide member for accommodating the linear movement of the drive wheel assembly and further includes a resilient suspension member that provides a tractive effort force to the drive wheel. The drive wheel assembly is supported on a carriage that is attached to one of the at least one linear bearing or the slide member and a mounting block is attached to the other. The mounting block has a clamp (Continued)

interface with a locating tab that engages a corresponding mounting slot in the mounting clamp.

14 Claims, 8 Drawing Sheets

(56) References Cited

U.S. PATENT DOCUMENTS

| | | | |
|---|---|---|---|
| 5,291,959 A | | 3/1994 | Malblanc |
| 5,351,774 A | | 10/1994 | Okamoto |
| 5,651,422 A | | 7/1997 | Casali |
| 9,775,755 B2 | * | 10/2017 | Tallino ................. B62B 5/0079 |
| 2010/0300777 A1 | * | 12/2010 | Tallino ................. A61G 5/1054 |
| | | | 180/12 |
| 2012/0279789 A1 | | 11/2012 | Brill et al. |
| 2014/0262575 A1 | * | 9/2014 | Richter ................. A61G 5/022 |
| | | | 180/11 |
| 2015/0001833 A1 | | 1/2015 | Golden, Jr. |
| 2015/0351980 A1 | | 12/2015 | Richter |

FOREIGN PATENT DOCUMENTS

| | | | | |
|---|---|---|---|---|
| EP | 1927331 A1 | | 6/2008 | |
| GB | 2481404 A | * | 12/2011 | ............. A61G 5/047 |
| KR | 20140101970 | | 8/2014 | |

OTHER PUBLICATIONS

DKY Inmotor detachable power drive unit, Jul. 1, 2018 YouTube video screenshots.
PCT/US2019/068377 International Search Report and International Preliminary Report on Patentability, dated Mar. 10, 2020.
EP19899962.5, Supplemental European Search Report, dated Aug. 10, 2022.
English EPO Machine translation of DE19935506A1.

* cited by examiner

MANUAL WHEELCHAIR PROPULSION SYSTEM

CROSS-REFERENCE TO RELATED APPLICATIONS

This application is the U.S. National Phase of International Application PCT/US2019/068377 filed Dec. 23, 2019, which designated the U.S. and that International Application was published in English under PCT Article 21(2) on Jun. 25, 2020 as International Publication Number WO 2020/132685 A1. PCT/US2019/068377 claims the benefit of U.S. Provisional Application No. 62/784,015, filed Dec. 21, 2018. Thus, the subject nonprovisional application claims priority to U.S. Provisional Application No. 62/784,015, filed Dec. 21, 2018. The disclosures of both applications are incorporated herein by reference in their entirety.

BACKGROUND OF THE INVENTION

This invention relates in general to manual wheelchairs. In particular, this invention relates to auxiliary propulsion devices for manual wheelchairs.

Manual wheelchairs are cost effective mobility aids, many of which are foldable for easy transport. Manual wheelchairs generally rely either on an attendant or the user for propulsion power. Users with sufficient upper body strength can propel a manual wheelchair for some distance but fatigue is an inevitable outcome if the travel distance is long. Devices designed to provide auxiliary motive power to a manual wheelchair are known. These devices are either incorporated into the large, hand-rim, drive wheels or provided as add-on units typically attached to structural elements of the manual wheelchair, such as frames or rear axle tubes or mounts.

These add-on auxiliary power drives have challenges related to ease of attachment and detachment to the manual wheelchair structure and transfer of propulsion forces between the wheelchair and the particular travel surface. It would be advantageous to provide an improved add-on propulsion unit for manual wheelchairs that overcomes these shortcomings of prior systems.

SUMMARY OF THE INVENTION

This invention relates to auxiliary propulsion devices for manual wheelchairs. In one embodiment, the auxiliary propulsion device is a propulsion system for a manual wheelchair where the system includes a mounting clamp and a propulsion drive unit. The propulsion drive unit includes a drive wheel assembly and a support suspension. The support suspension is configured to provide linear movement of the drive wheel and drive hub assembly relative to the manual wheelchair.

In one embodiment, the support suspension of the propulsion system includes a linear bearing and slide member assembly having at least one linear bearing and a slide member for accommodating the linear movement of the drive wheel assembly. The support suspension also includes a resilient suspension member that provides a tractive effort force to the drive wheel. The drive wheel assembly is supported on a carriage that is attached to one of the at least one linear bearing or the slide member and having a suspension mount in contact with the resilient suspension member. The mounting clamp is connected to the other of the linear bearing or the slide member. In another aspect of the invention, actuator provides selective linear movement of the carriage between a drive position where the drive wheel contacts the ground and a stowed position where the drive wheel is out of contact with the ground.

The mounting clamp is selectively engaged to a mounting block that is attached to the other of the at least one linear bearing or slide member. The mounting block has a clamp interface that engages the mounting clamp. The mounting clamp includes a mounting cavity having a lead-in wall and a mounting slot. The lead-in wall is shaped to guide a portion of the clamp interface into the mounting slot. In one configuration of the propulsion system, the clamp interface includes a locating tab that is configured to seat into the mounting slot.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
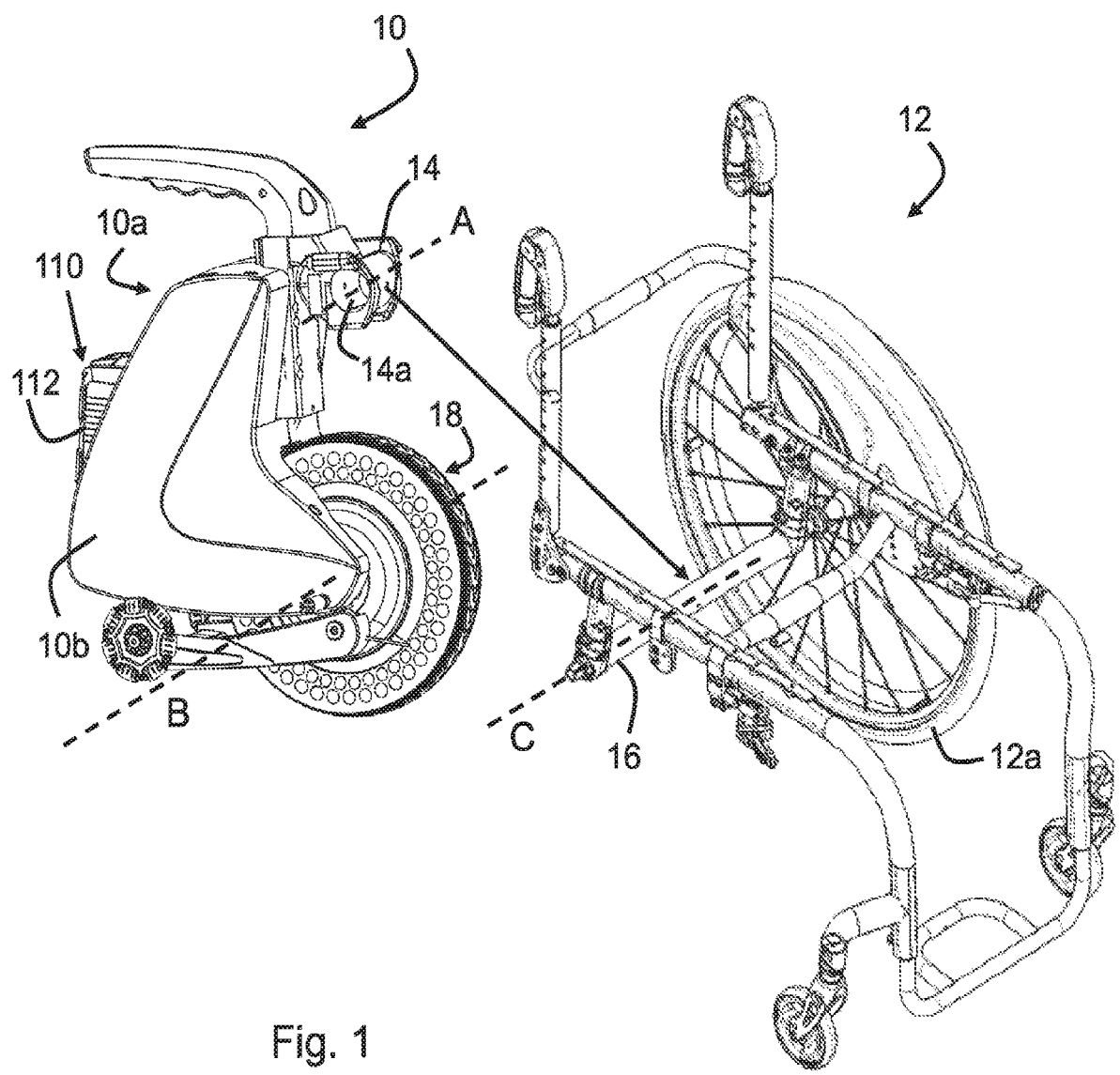
FIG. 1 is a perspective view of a manual wheelchair and a detachable propulsion system according to the invention.
Figure 2:
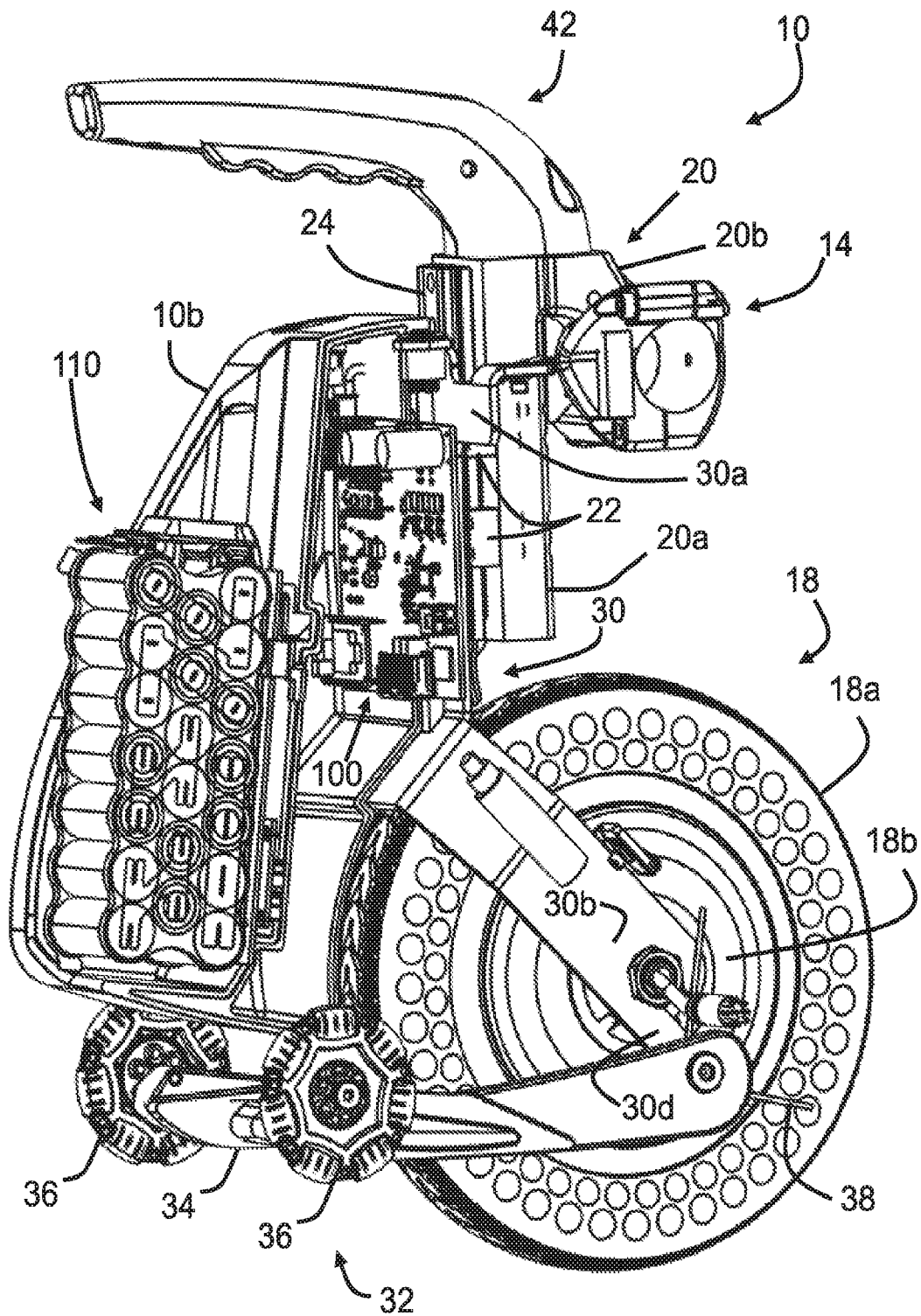
FIG. 2 is a perspective view of the detachable propulsion system of FIG. 1.

Referring now to the drawings, there is illustrated in FIG. 1 a detachable propulsion system, shown generally at 10, configured to be mounted to a manual wheelchair 12. In the illustrated embodiment, the propulsion system 10 includes a propulsion unit 10a and a clamp 14 that is configured to attach to a structural member of the wheelchair 12, such as a cross-member, a camber tube, or axle tube 16. The clamp 14 has at least one aperture 14a that defines a mounting axis A. The propulsion system 10 further includes a drive wheel assembly 18, illustrated as a tire 18a and hub motor assembly 18b, though other drive systems such as a motorized pinch-roller or friction drive, belt or chain drive, shaft drive, and the like may be used. The drive wheel assembly 18 defines a wheel rotational axis B through the hub rotational centerline and an associated tire contact patch, i.e., the area of the tire in contact with a support surface such as the ground. The wheelchair 12 includes drive wheels 12a, though only one wheel is illustrated two spaced-apart drive wheels are known, that define a rotational axis C and an associated tire contact patch.

Figure 3:
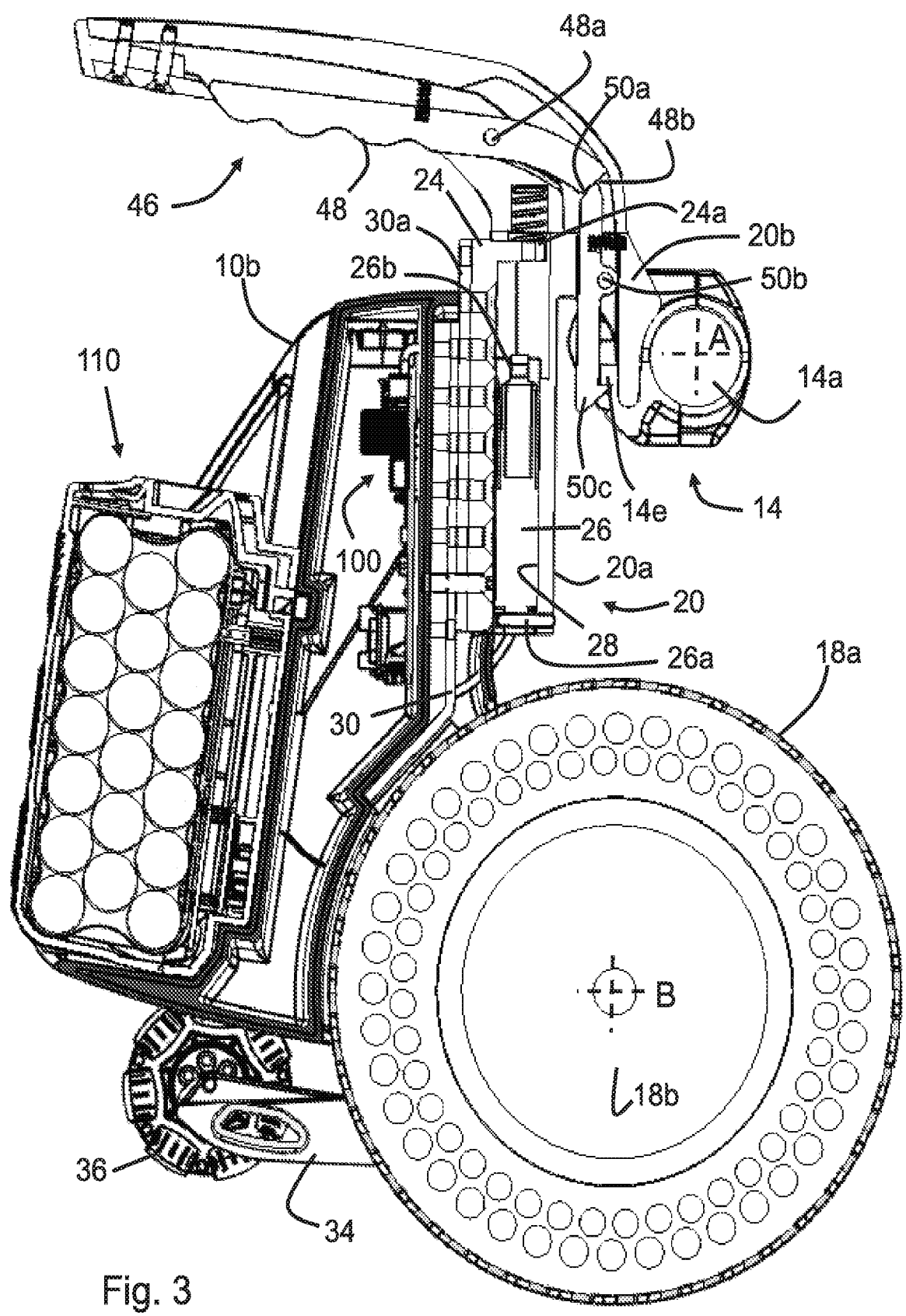
FIG. 3 is a cross sectional, side elevational view of the detachable propulsion system of FIG. 2.

Referring to FIGS. 2-4B, the propulsion system 10 includes a mounting block 20 having a slide mounting body 20a and a clamp interface 20b. The slide mounting body 20a is configured to attach to one of at least one slide bearing 22 or a mating slide 24, configured as a slide bar, track or other suitable linear motion structure. Though identified as "slide" bearings, these bearings 22 may be any suitable rolling or sliding element including bearings, bushings, or other elements conducive to supporting linear motion. In the illustrated embodiment, the slide bar 24 includes a suspension reaction mount 24a. The mounting block 20 is connected to an actuator 26, illustrated within a cavity 28 of the slide mounting body 20a, at a first or lower end 26a of the actuator 26. The actuator 26 selectively engages a carriage 30 at a second or upper end 26b of the actuator 26. The carriage 30 has a mounting plate 30a that is proximate to and configured to attach to the other of the at least one slide bearing 22 or the mating slide 24 such that the carriage 30 is linearly moveable relative to the mounting block 20. The carriage 30 has a drive wheel fork 30b at a distal end that supports the drive wheel assembly 18 for rotation. The carriage 30 further includes a slide mount 30c that supports one of the slide bar 24 or the at least one slide bearing 22. In the illustrated embodiment, the suspension reaction mount 24a is attached to the slide bar 24 and extends into the actuator cavity 28 and is configured to be contacted by the actuator second end 26b when the actuator 26 is extended. Alternatively, the suspension reaction mount 24a may be formed integrally with the slide bar 24 or the carriage 30 if desired. The actuator 26 selectively moves the carriage 30 and the drive wheel 18 relative to the mounting block 20 between a use position, where the drive wheel is in contact with the ground, and a stowed position, where the drive wheel is moved out of contact with the ground. FIG. 3 illustrates the actuator 26 in the use position where the second end 26b is retracted away from the suspension reaction mount 24a. The carriage 30 is shown in an articulated position where the suspension reaction mount 24a has compressed a resilient suspension member such as during an obstacle traversal maneuver by the propulsion system 10.

Figure 7A:
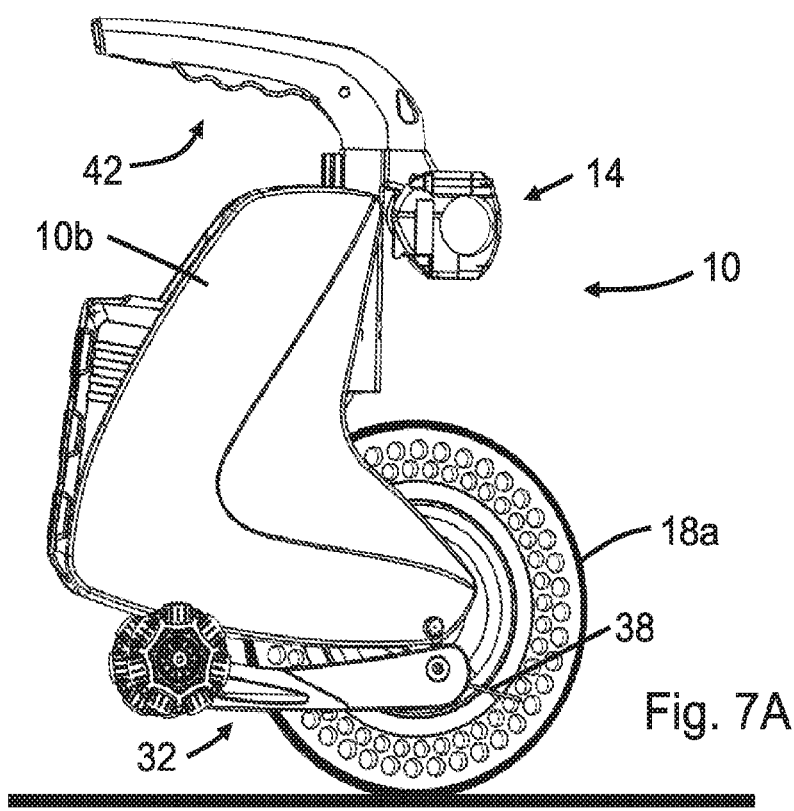
FIG. 7A is a side view of the detachable propulsion system in an operating position.
Figure 7B:
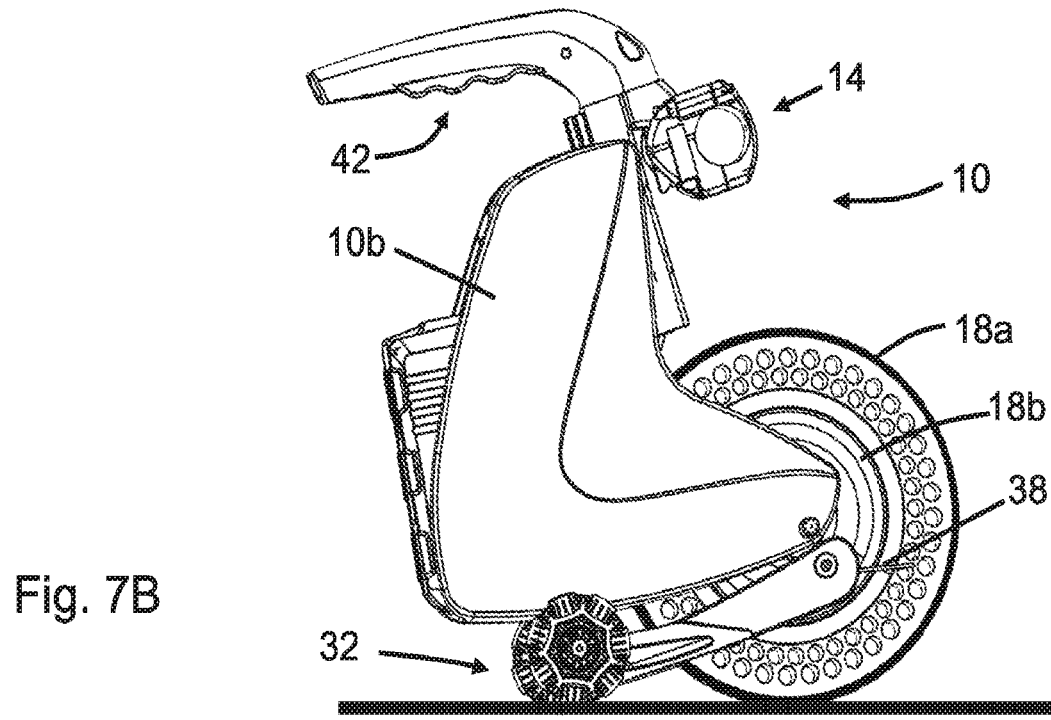
FIG. 7B is a side view of the detachable propulsion system in a detached position.
Figure 8:
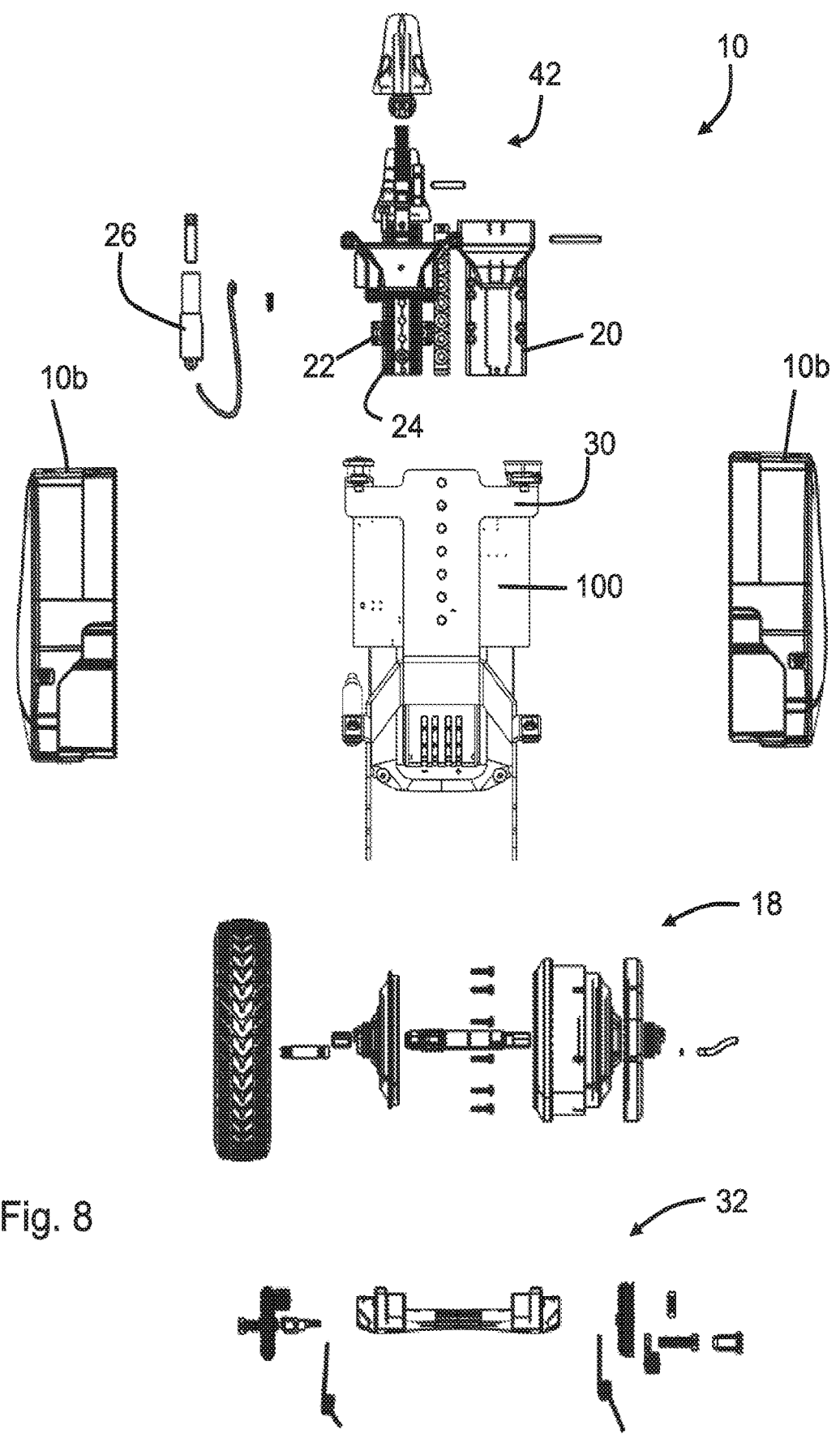
FIG. 8 is an exploded view of the detachable propulsion system.

The carriage 30 includes at least one kickstand mount 30d, illustrated as extending from the drive wheel fork 30b, for supporting a kickstand 32. The kickstand 32 supports the system 10 in a free-standing configuration, as shown in FIG. 7B, when detached from the wheelchair 12 or the clamp 14. The illustrated kickstand 32 includes a kickstand fork 34 pivotally mounted to the kickstand mount 30d at a first end and supporting at least one wheel 36 at a second end. Two wheels 36, illustrated as Omni-style or Mecanum-style wheels having lateral roller elements, are shown mounted on opposing arms of the kickstand fork 34. The Omni-style wheels accommodate lateral movement of the propulsion system 10, making attachment or detachment of the unit easier by a user from a seated position. It should be understood that any wheel or sliding contact member may be used if so desired. The fork 34 is held out of contact with the ground or support surface, as shown in FIG. 7A, by a spring 38. The kickstand 32 is configured to clear or pivot away from irregularities encountered during travel in order to prevent force transfers to the wheelchair 12 that can cause unintended deviations in the desired travel direction.

Figure 4B:
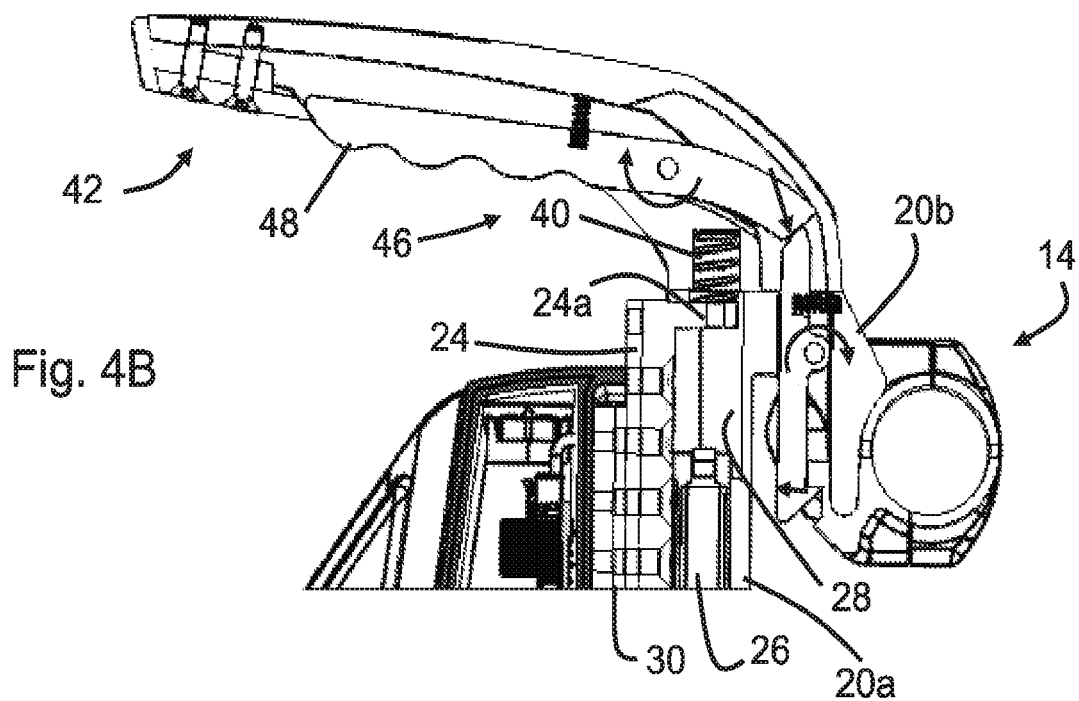
FIG. 4B is a cross sectional view of the attachment portion of the detachable propulsion system of FIG. 4A.
Figures 5A, 5B:
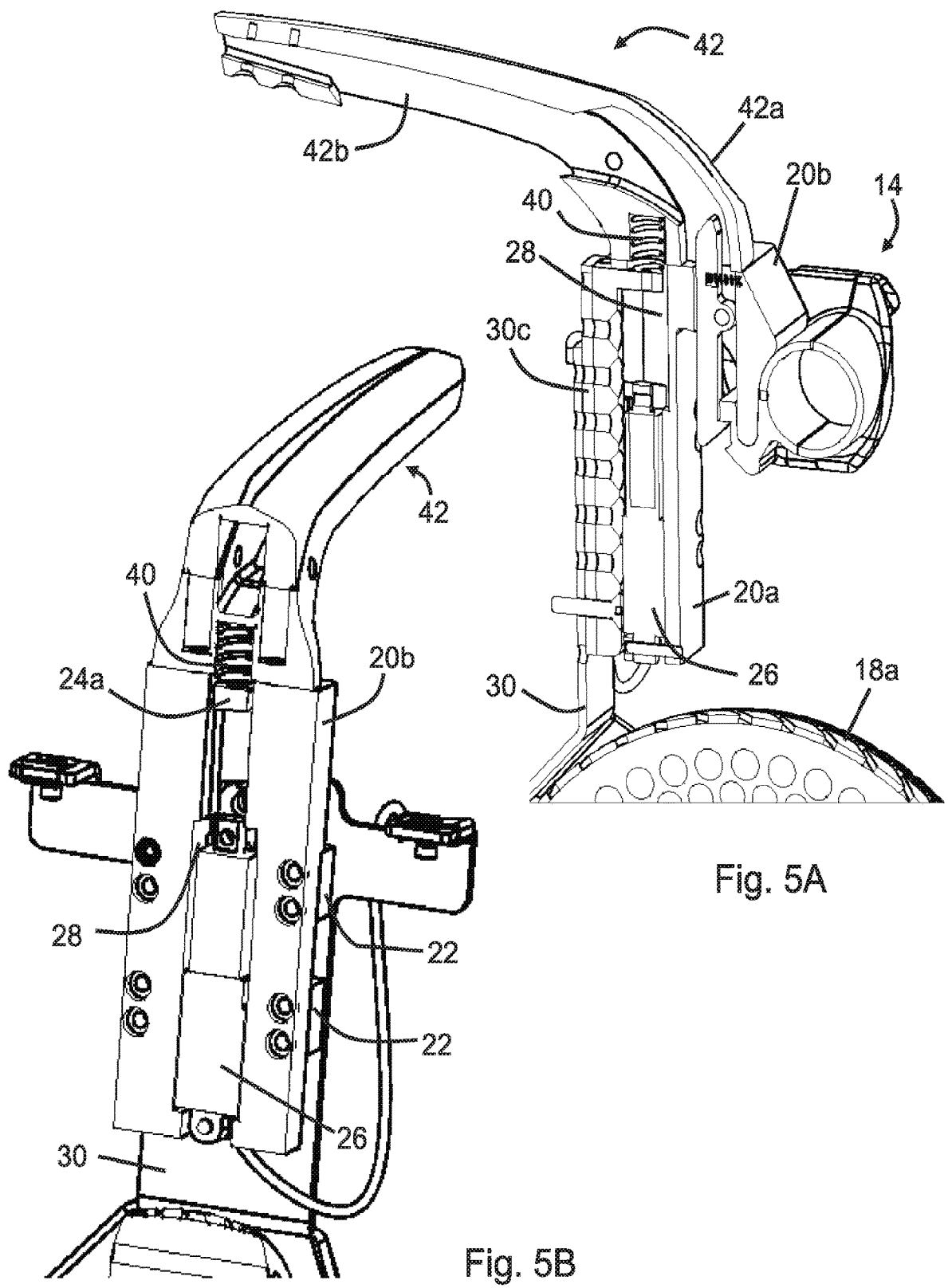
FIG. 5A is a side perspective view, in cross section, of an actuation and suspension portion of the detachable propulsion system of FIG. 1.
FIG. 5B is a front perspective view, in cross section, of the actuation and suspension portion of the detachable propulsion system of FIG. 5A.

Referring to FIGS. 3, 5A and 5B, the slide mounting body 20a supports a resilient suspension member 40, shown as a coil compression spring though other resilient elements may be used. The suspension spring 40 applies a force to the carriage 30 and drive wheel assembly 18, through the suspension reaction mount 24a, that is sufficient to provide traction to propel the wheelchair 12. The suspension spring 40, in contact with the suspension reaction mount 24a, compresses and extends as the drive wheel system 18 moves over irregular surfaces to maintain ground contact. In the illustrated embodiment, a handle 42 is secured to the slide mounting body 20a. The handle 42 is shown having an upper body 42a and a lower body 42b. The lower body 42b includes a spring seat 44 that contacts the suspension spring 40. The spring seat 44 may alternatively be part of the mounting body 20a. The upper body 42a supports and/or houses at least a portion of a latching mechanism, shown generally at 46 of FIG. 4B, which will be explained in detail below. During movement of the drive wheel system 18, the slide 24 shown mounted to the carriage 30 is supported by and moves linearly against the slide bearings 22. The slide 24 and slide bearings 22 transfer the tractive force of the drive wheel to the clamp 14 and wheelchair axle or cross member 16 thus moving the wheelchair 12 forward. The linear motion of the slide members 24 and 22 permits the drive wheel 18a to articulate relative to terrain irregularities and permits the actuator 26 to move the drive wheel 18a out of contact with the ground if only manual propulsion is desired. This permits a user to easily reduce drag from the propulsion unit 10a in manual mode operation without removing the unit.

The latching mechanism 46, as illustrated, is supported by the handle 42 and the mounting block 20. The latching mechanism 46 includes an actuation lever 48 that is pivotally supported by a pin 48a on the handle lower body 42b and resiliently held in a ready position enabling release of the propulsion unit 10a portion of the propulsion system 10 from the clamp 14. The actuation lever 48 has an actuation cam face 48b that contacts a latch cam face 50a of a latch hook 50. The latch hook 50, as illustrated, is pivotally supported on the mounting block 20 by a pin 50b and resiliently held in an engaged position where a hook end 50c is positioned to hold the propulsion unit 10a fixed to the clamp 14. Because the latch cam face 50a is movable relative to the actuation cam face 48b, the hook end 50c is movable relative to the mounting block to permit securement of the propulsion unit 10a to the clamp 14 without operating the actuation lever 48. This permits easier attachment of the unit 10a by a seated user.

Figure 4A:
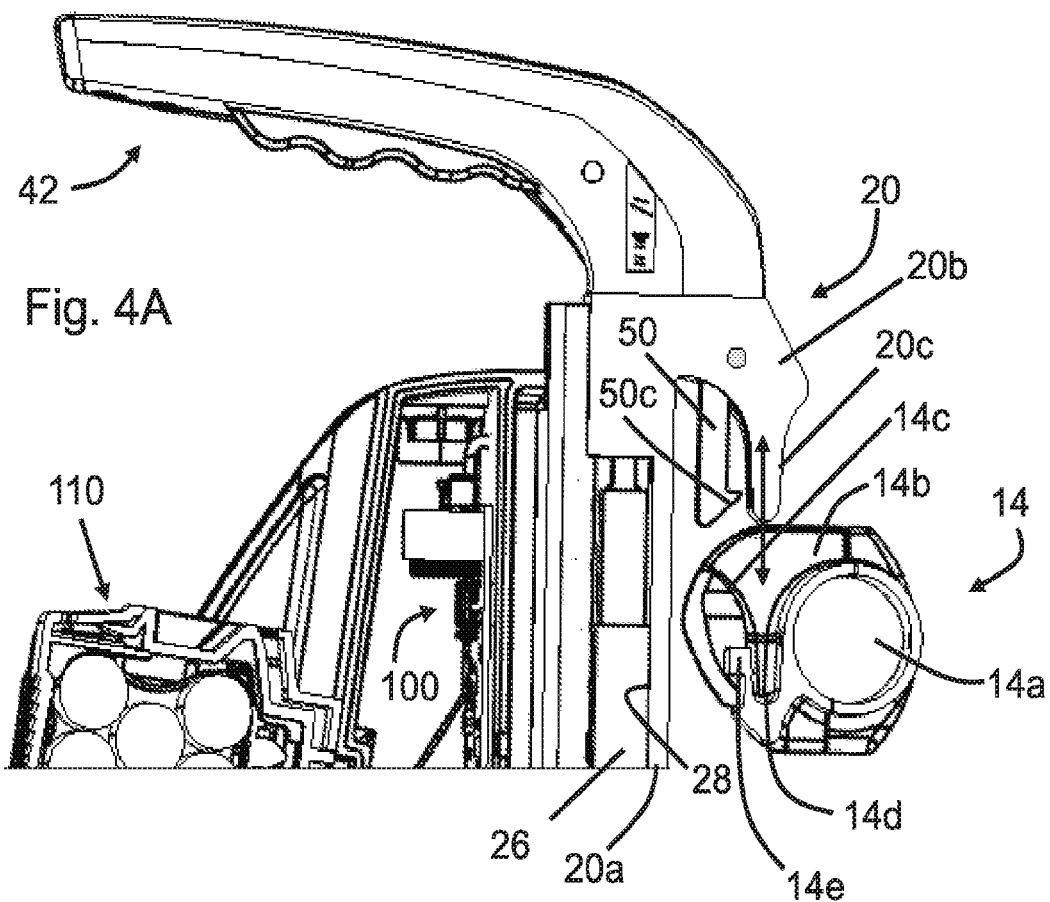
FIG. 4A is an enlarged view of an attachment portion of the detachable propulsion system of FIG. 2.

The clamp 14, as shown in FIGS. 4A and 4B, includes a mounting cavity 14b having a lead-in wall 14c terminating in a mounting slot 14d. The mating clamp interface 20b of the mounting block 20 includes a locating tab or tongue 20c that is configured to locate and seat within the mounting slot 14d. In the illustrated embodiment, the mounting cavity 14b can function as a funnel or chute to guide the locating tab 20c into engagement with the mounting slot 14d. In connecting the propulsion unit 10a to the clamp 14, the following sequence of actions or steps illustrate the functions and interactions of the mounting elements of the propulsion system 10. Initially, the propulsion unit 10a may be free-standing with the aid of the kickstand 32 such that the locating tab 20c is aimed toward the clamp 14 mounted on the axle or camber tube 16 of the manual wheelchair 12. When the actuator 26 is contracted, the mounting block 20 is raised relative to the carriage 30 by extension of the suspension spring 40 toward its free state length. In certain wheelchair configurations, the locating tab 20c may be sufficiently elevated to enter the mounting cavity 14b as the propulsion unit 10a rests on the kickstand 32. When the unit 10a is aligned relative to the clamp 14, the wheelchair may be rolled backwards until the locating tab 20c enters the mounting cavity 14b. In other configurations, the unit may need to be elevated by the user through the handle 42. After the tab 20c enters the cavity 14b, the actuator 26 may be extended to draw the locating tab 20c into the mounting slot 14d. When the tab 20c completely enters the slot 14d, the hook end 50c of the latch hook 50 engages a latching boss 14e of the clamp 14 to secure the propulsion unit 10a to the clamp 14 and the wheelchair 12.

In order to remove or disconnect the unit 10a from the clamp 14, the latching mechanism 46 may be activated by moving the actuation lever 48 into the handle 42. This causes the lever 48 to pivot about pin 48a causing the actuation cam face 48b to move the latch cam face 50a toward the clamp 14. The latch hook 50 pivots about the latch pivot pin 50b causing the hook end 50c to disengage from the latching boss 14e. If the unit 10a is loaded against the ground with the suspension spring 40 compressed, the force exerted by the spring may assist in extracting the clamp interface 20b from the mounting cavity 14b as the mounting block 20 is moved by the spring force. If the actuator 26 is extended to compress the suspension spring 40 and raise the drive wheel 18a from contact with the ground, the latch hook 50 may be more easily pivoted and the unit 10a can be lifted from the mounting cavity 14b Alternatively, the actuator 26 may include a linkage (not shown) that releases the latch hook 50 when the actuator 26 is extended beyond the length necessary to lift the wheel off of the ground. The actuator 26 may be directly or indirectly connected to the latch hook 50 or may actuate the lever 48 in order to provide remote or automated actuation.

Figure 6A:
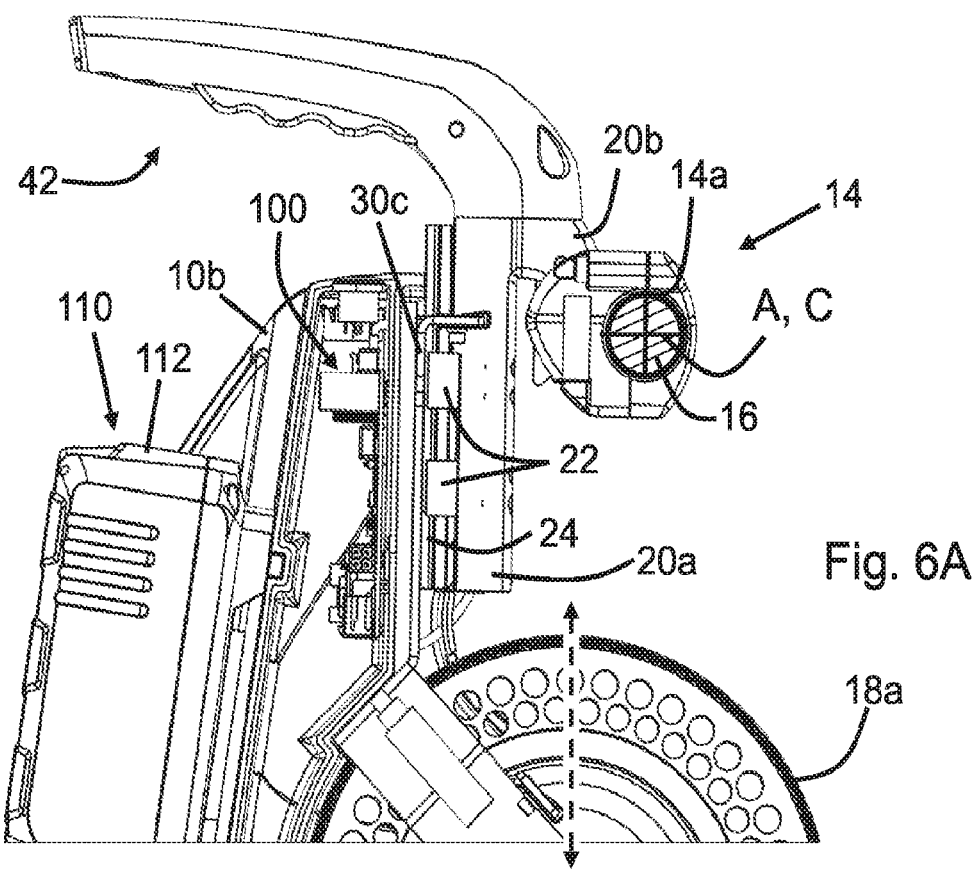
FIG. 6A is a side elevational view of the detachable propulsion system of FIG. 1 mounted to an axle tube component of the wheelchair.
Figure 6B:
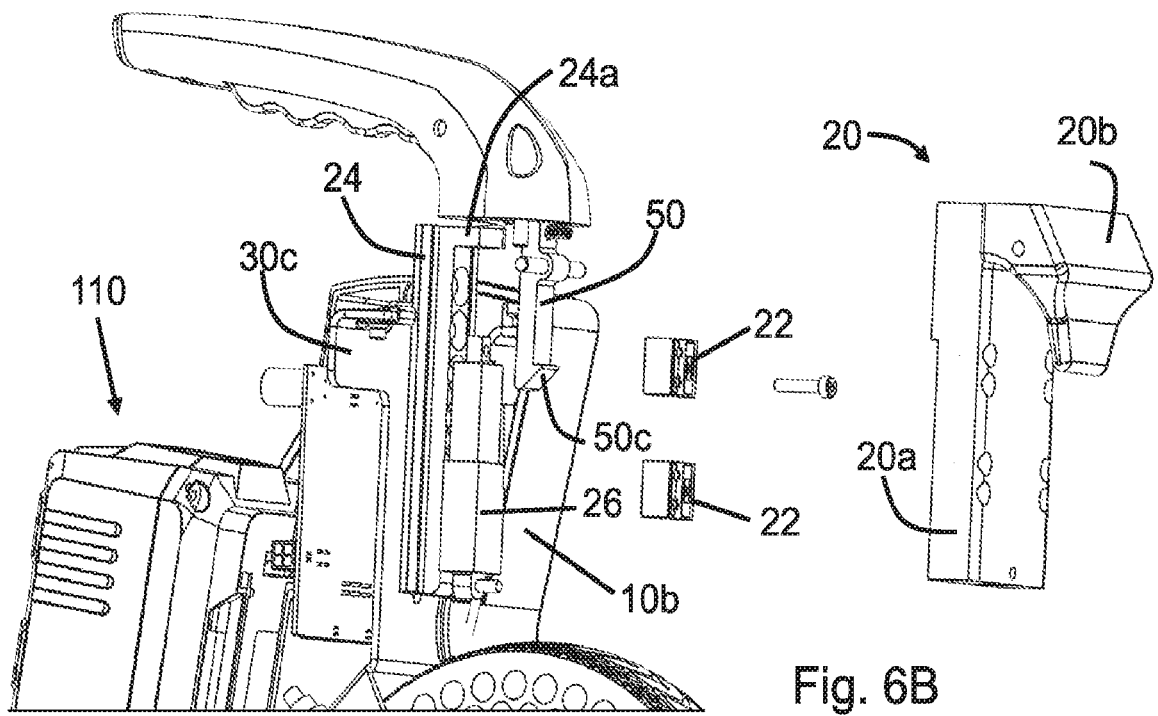
FIG. 6B is a partially exploded view of a suspension slide assembly of the detachable propulsion system.

Referring to FIGS. 3 and 6A, when the propulsion system 10 is mounted to the wheelchair 12 the clamping axis A is coincident with the axle tube axis C. Because the drive wheel axis B extends toward the clamping axis A, the drive wheel tire contact patch is moved close to or coincident with the tire patch of the wheelchair drive wheel 12a. This results in the system 10 being contained within an envelope defined by the wheelchair 12, including the drive wheels 12a. In one aspect, the envelope can be defined by a line generally tangent to an outer diameter of the wheelchair drive wheel and may represent a wall or other external structure abutting the wheelchair drive wheel. This packaging permits a seated user to operate the manual wheelchair 12 in the usual manner, including being able to manually back the wheelchair against a wall, curb, or other structure and also lean the wheelchair against a wall, which is a common resting position providing the weight distribution benefits of a reclined, seated position to reduce prolonged seated skin conditions. The close proximity of the drive wheel contact patches is primarily enabled by the use of sliding suspension members instead of pivoting suspension members. This provides the ability to package the moving components in a compact envelope. In one embodiment, this permits the unit to be mounted in a rearward position that is more easily accessible by the seated user for attaching and disconnecting the unit fostering a greater sense of independence. Alternatively, the propulsion system 10 may be mounted from the front side of the wheelchair and extend toward the rear.

During operation, when the propulsion unit drive wheel tire patch is close to or in line with the wheelchair drive wheel tire patch, the moment created by the offset is minimized. This reduces the cause of tire scrubbing and permits easier turning and maneuvering of the wheelchair. Since the operating basis of the wheelchair is manual in nature, maneuvering is based on relative speed or rotation of one drive wheel 12a relative to the other spaced-apart drive wheel 12a. Through the use of a linear motion suspension system and the rearward mounting configuration of the propulsion system 10, particularly mounting the system to the wheelchair drive wheel axle or camber tube member, the weight of the unit is brought closer to the center of gravity of the wheelchair and seated user which reduces tipping or instability sensations. This location also can take advantage of the weight over the wheelchair drive wheels to improve tractive effort of the propulsion drive wheel 18a.

As shown in the drawings, the propulsion system 10 includes a controller 100 containing electronics necessary to operate the propulsion unit for drive control, suspension control, and/or latch control. The controller 100 and other components of the propulsion system may be enclosed in a housing 10b, though such is not required. The propulsion unit 10 also includes an energy source, illustrated as a battery pack 110 and a battery housing 112. The controller 100 may include all of the necessary sensors within the controller or may receive signals from remote sensors for processing. The actuator 26 may be configured as an electrically driven actuator and rely on a current measurement to detect end of travel positioning. Such a sensor and its associated measurement may be provided on the controller 100. Alternatively, the actuator 26 may rely on a proximity switch or load cell to detect the end of travel position which may be remote mounted from the controller 100 and attached to the actuator or a supporting structure.

In two of the preferred embodiments shown herein, as illustrated in FIGS. 8A-12, a first version is shown in FIGS. 8A-8C and 11. This version, identified as Embodiment 2, includes a power drive wheel with hub motor and a linearly movable support housing with carriage rollers. The carriage rollers are supported and guided by slots formed in the housing. A mounting bolt extends through the slot to slidably secure the carriage roller blocks to the housing. In the illustrated embodiment, the slots are formed in generally parallel raised portions that engage corresponding recesses formed in the carriage roller blocks.

In the version identified as Embodiment 3, the power drive wheel with hub motor is mounted in a linearly movable support housing using linear bearings. The linear bearings engage a slide track having parallel grooves that support and guide the linear bearings.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A propulsion system for a manual wheelchair, the system comprising:
  a mounting clamp configured to attach to the manual wheelchair between two spaced-apart wheelchair drive wheels, the wheelchair drive wheels each defining a wheelchair drive wheel tire patch on a support surface;
  a propulsion drive unit selectively attachable to the mounting clamp, the propulsion unit comprising:
  a drive wheel assembly defining a drive wheel tire patch, the drive wheel tire patch generally in line with each wheelchair drive wheel tire patch when the drive wheel tire contacts the support surface; and
  a support suspension configured to provide linear movement of the drive wheel and a drive hub assembly relative to the manual wheelchair, the support suspension comprising a linear bearing and slide member assembly having at least one linear bearing and a slide member for accommodating the linear movement of the drive wheel assembly and a resilient suspension member providing a tractive effort force to the drive wheel.

2. The propulsion system of claim 1 wherein the drive wheel assembly is supported on a carriage, the carriage attached to one of the at least one linear bearing or the slide member and having a suspension mount in contact with the resilient suspension member, the mounting clamp connected to the other of the linear bearing or the slide member.

3. The propulsion system of claim 2 wherein an actuator provides selective linear movement of the carriage between a drive position where the drive wheel contacts a support surface and a stowed position where the drive wheel is out of contact with the support surface.

4. The propulsion system of claim 3 wherein the actuator is an electrically driven actuator attached at a first end to a mounting block, the mounting block is attached to the at least one linear bearing and the carriage is attached to the slide member, the mounting block is selectively attachable to the clamp and has a spring seat, the resilient suspension member is positioned between the spring seat and the suspension mount.

5. The propulsion system of claim 4 wherein the actuator has a second end that selectively engages the suspension mount to move the drive wheel out of contact with the support surface.

6. The propulsion system of claim 2 wherein the mounting clamp includes a mounting cavity having a lead-in wall and a mounting slot and is attached to the other of the at least one linear bearing or slide member, the mounting clamp is selectively engaged to a mounting block which has a clamp interface, the mounting clamp lead-in wall is shaped to guide a portion of the clamp interface into the mounting slot.

7. The propulsion system of claim 4 wherein the mounting block supports a latching mechanism having a latch hook that is resiliently held in an engaged position such that the latch hook is movable relative to the mounting block to permit securement without an additional manipulation of the latch hook.

8. The propulsion system of claim 7 wherein the mounting block supports a handle, the handle includes an actuation lever that moves the latch hook between an engaged position where the propulsion unit is fixed to the clamp and a disengaged position where the propulsion unit is removable from the clamp.

9. The propulsion system of claim 8 wherein the actuation lever is pivotally supported on the handle and has an actuation cam face configured to contact a latch cam face of the latch hook such that movement of the actuation lever moves the latch hook into the disengaged position.

10. The propulsion system of claim 2 wherein the drive wheel and carriage define a propulsion unit and a kickstand supports the propulsion unit in a free-standing configuration when detached from the mounting clamp.

11. The propulsion system of claim 10 wherein the kickstand is pivotally mounted to the carriage and a spring maintains the kickstand in a position out of contact with a support surface when the propulsion unit is connected to the mounting clamp.

12. The propulsion system of claim 11 wherein the kickstand includes at least one of a wheel or a sliding support that contacts the support surface in the free-standing configuration.

13. A propulsion system for a manual wheelchair, the system comprising:
- a mounting clamp configured to attach to the manual wheelchair between two spaced-apart wheelchair drive wheels, the wheelchair drive wheels each defining a wheelchair drive wheel tire patch on a support surface, one of a cross-member, an axle tube or a camber tube defining a wheelchair mounting axis, the manual wheelchair drive wheel defining an envelope tangent to an outer diameter of the manual wheelchair drive wheel and the mounting clamp defining a propulsion unit mounting axis which are aligned when the mounting clamp is attached to the manual wheelchair;
- a propulsion drive unit selectively attachable to the mounting clamp, the propulsion unit comprising:
- a drive wheel assembly defining a drive wheel tire patch, the drive wheel tire patch generally in line with each wheelchair drive wheel tire patch when the drive wheel tire contacts the support surface, the propulsion drive unit drive wheel defining a drive wheel axis that is positioned within the envelope when the mounting clamp is attached to the manual wheelchair; and
- a support suspension configured to provide linear movement of the drive wheel and drive hub assembly relative to the manual wheelchair.

14. The propulsion system of claim 13 wherein the propulsion unit drive wheel is supported on a carriage, the carriage is connected to an actuator that provides selective linear movement of the carriage between a drive position where the drive wheel contacts the support surface and a stowed position where the drive wheel is out of contact with the support surface, the drive wheel axis positioned within the envelope in at least the stowed position.

* * * * *